(12) United States Patent
Rajani et al.

(10) Patent No.: US 11,775,861 B1
(45) Date of Patent: Oct. 3, 2023

(54) SELECTING A MESSAGING APPLICATION FROM MULTIPLE MESSAGING APPLICATIONS ELIGIBLE TO BE A DESTINATION OF A LINK INCLUDED IN A CONTENT ITEM PRESENTED TO AN ONLINE SYSTEM USER

(71) Applicant: Meta Platforms, Inc., Menlo Park, CA (US)

(72) Inventors: Mohit Rajani, San Francisco, CA (US); Himanshu Baweja, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 459 days.

(21) Appl. No.: 16/734,397

(22) Filed: Jan. 5, 2020

(51) Int. Cl.
*H04L 51/52* (2022.01)
*G06N 20/00* (2019.01)
*H04L 51/046* (2022.01)

(52) U.S. Cl.
CPC .......... *G06N 20/00* (2019.01); *H04L 51/046* (2013.01); *H04L 51/52* (2022.05)

(58) Field of Classification Search
CPC ....... H04L 51/18; H04L 51/046; H04L 51/16; H04L 67/02; H04L 67/34; H04L 51/04; H04L 67/22; H04L 51/52; G06F 16/94; G06F 16/955; G06F 40/134; G06F 16/335; G06F 17/18; H04W 4/02; H04W 4/12; G06Q 30/0269; G06Q 30/0251; G06Q 30/0277; G06N 20/00

See application file for complete search history.

(56) References Cited

U.S. PATENT DOCUMENTS

| | | | | |
|---|---|---|---|---|
| 9,191,615 | B1* | 11/2015 | Valimaki | H04L 51/046 |
| 2016/0055133 | A1* | 2/2016 | Look | G06F 40/134 |
| | | | | 715/205 |
| 2016/0140670 | A1* | 5/2016 | Gupta | G06Q 30/0201 |
| | | | | 705/7.29 |
| 2018/0189674 | A1* | 7/2018 | Hillard | G06N 20/00 |
| 2019/0065978 | A1* | 2/2019 | Martine | H04L 67/20 |
| 2019/0318004 | A1* | 10/2019 | Rohatgi | G06F 16/93 |

\* cited by examiner

*Primary Examiner* — Eric J Yoon
(74) *Attorney, Agent, or Firm* — Fenwick & West LLP

(57) ABSTRACT

An online system identifies an opportunity to present content to a viewing user and accesses a model trained to predict a likelihood that a user will perform an action responsive to being presented with a link that launches a messaging application and initiates a conversation with an entity via the messaging application, in which the likelihood is predicted based on which of multiple messaging applications is selected and attributes of the user. For each of multiple candidate messaging applications, the trained model is applied to predict the likelihood that the viewing user will perform the action if the candidate messaging application is selected. A messaging application is selected from the candidate messaging applications based on the likelihoods and a content item including a link that launches the selected application and initiates a conversation with the entity via the selected application is generated and sent for display to the viewing user.

20 Claims, 3 Drawing Sheets

SELECTING A MESSAGING APPLICATION FROM MULTIPLE MESSAGING APPLICATIONS ELIGIBLE TO BE A DESTINATION OF A LINK INCLUDED IN A CONTENT ITEM PRESENTED TO AN ONLINE SYSTEM USER

BACKGROUND

This disclosure relates generally to online systems, and more specifically to selecting a messaging application from multiple messaging applications eligible to be a destination of a link included in a content item presented to an online system user.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. Content items may include links that launch various types of applications, such as messaging applications. Furthermore, content items that include links that launch messaging applications also may initiate conversations via the messaging applications.

Conventionally, to maximize user engagement with online systems, online systems select content items for presentation to their users with which the users are likely to engage. The online systems may select these content items based on information associated with the content items and information associated with the users. For example, an online system may select one or more content items for presentation to an online system user based on targeting criteria and tags associated with the content items, as well as user profile information associated with the user and information describing actions previously performed by the user.

However, it may be difficult for online systems to select content items for presentation to their users with which the users are likely to engage if the content items include links that launch messaging applications and initiate conversations via the messaging applications and if multiple messaging applications may be eligible to be the destination of each link. The reason for this is that different online system users may prefer to use different messaging applications for different reasons (e.g., based on personal preferences of the users, based on the types of client devices being used by the users, etc.). Furthermore, these preferences may change over time (e.g., as different messaging applications become more popular in different geographic locations, among different demographic groups, etc.). Thus, online systems may fail to maximize user engagement with the online systems since it may be difficult or impossible for the online systems to track the preferences of each of their users for different messaging applications and to keep these preferences updated.

SUMMARY

To maximize user engagement with online systems, online systems conventionally select content items for presentation to their users with which the users are likely to engage based on information associated with the content items and information associated with the users. However, it may be difficult for online systems to select content items for presentation to their users with which the users are likely to engage if the content items include links that launch messaging applications and initiate conversations via the messaging applications and if multiple messaging applications may be eligible to be the destination of each link. This is because different online system users may prefer to use different messaging applications for different reasons and these preferences may change over time. Consequently, online systems that are unable to track the preferences of each of their users for different messaging applications and to keep these preferences updated may fail to maximize user engagement with the online systems.

To address this issue, an online system selects a messaging application from multiple messaging applications eligible to be a destination of a link included in a content item presented to an online system user. More specifically, the online system identifies an opportunity to present content to a viewing user of the online system. The online system then accesses a machine-learning model trained to predict a likelihood that an online system user will perform a target action in response to being presented with a link that launches a messaging application and initiates a conversation with an entity via the messaging application, in which the likelihood is predicted based on which of multiple messaging applications is selected and one or more attributes of the user. For each of multiple candidate messaging applications, the trained machine-learning model is applied to predict the likelihood that the viewing user will perform the target action if the candidate messaging application is selected. Based on the predicted likelihoods, the online system selects a messaging application from the candidate messaging applications and generates a content item that includes a link that launches the selected messaging application and initiates a conversation with the entity via the selected messaging application. The content item is then sent to a client device associated with the viewing user for presentation to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
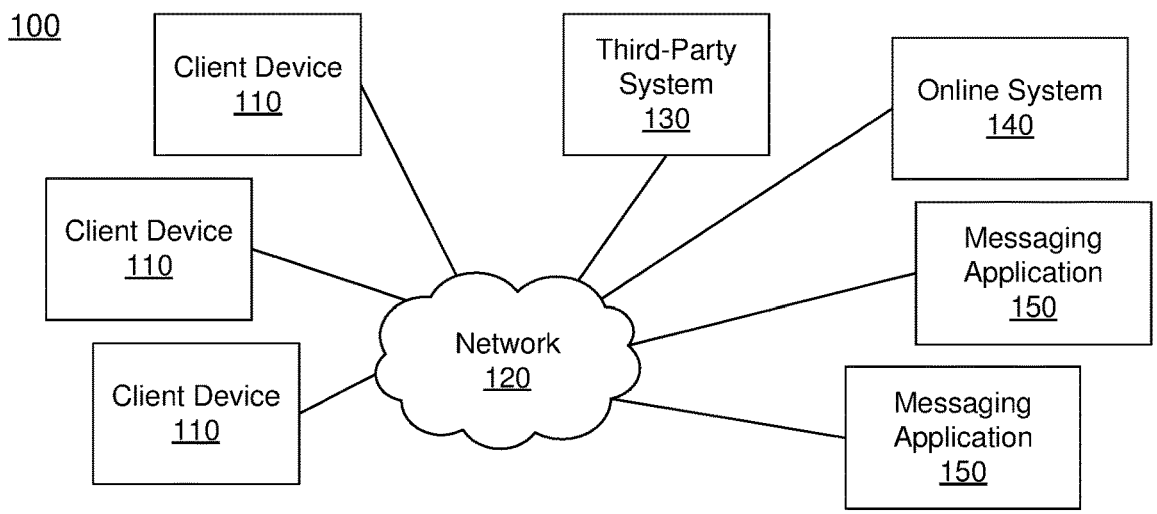
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, the online system 140, and one or more messaging applications 150. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

One or more messaging applications 150 may be coupled to the network 120 and allow users of the online system 140 to communicate with each other or with entities (e.g., businesses or organizations) via the messaging application(s) 150. Online system users and/or entities may participate in conversations by using client devices 110 associated with the users and/or entities to send and receive messages via the messaging application(s) 150. Messages included in a conversation via a messaging application 150 may be presented in a chat user interface in chronological order and may include various types of information associated with each message (e.g., information indicating a time at which each message was sent or received, information identifying a user or an entity who composed each message, etc.). Messages communicated via a messaging application 150 may include text data (e.g., words or phrases), image data (e.g., emojis, GIFs, photos, etc.), video data, audio data (e.g., voice messages, music, etc.), hyperlinks, objects (e.g., page posts or articles), or any other suitable types of content that may be communicated via the messaging application 150.

A messaging application 150 may be launched by a link that is presented to a user of the online system 140. In some embodiments, the link may be included among content presented to the user. For example, a link that launches a messaging application 150 may be included in a content item that is presented to a user of the online system 140 (e.g., in a newsfeed associated with a user profile of the user). In this example, the messaging application 150 may be launched on a client device 110 associated with the user upon receiving an interaction with the link (e.g., a click on the link) at the client device 110. Furthermore, a link that launches a messaging application 150 also may initiate a conversation with an online system user or an entity via the messaging application 150. In the above example, if the content item is associated with a particular entity (e.g., a business entity or an organization), a conversation with the entity via the messaging application 150 may be initiated upon receiving the interaction with the link at the client device 110.

Figure 2:
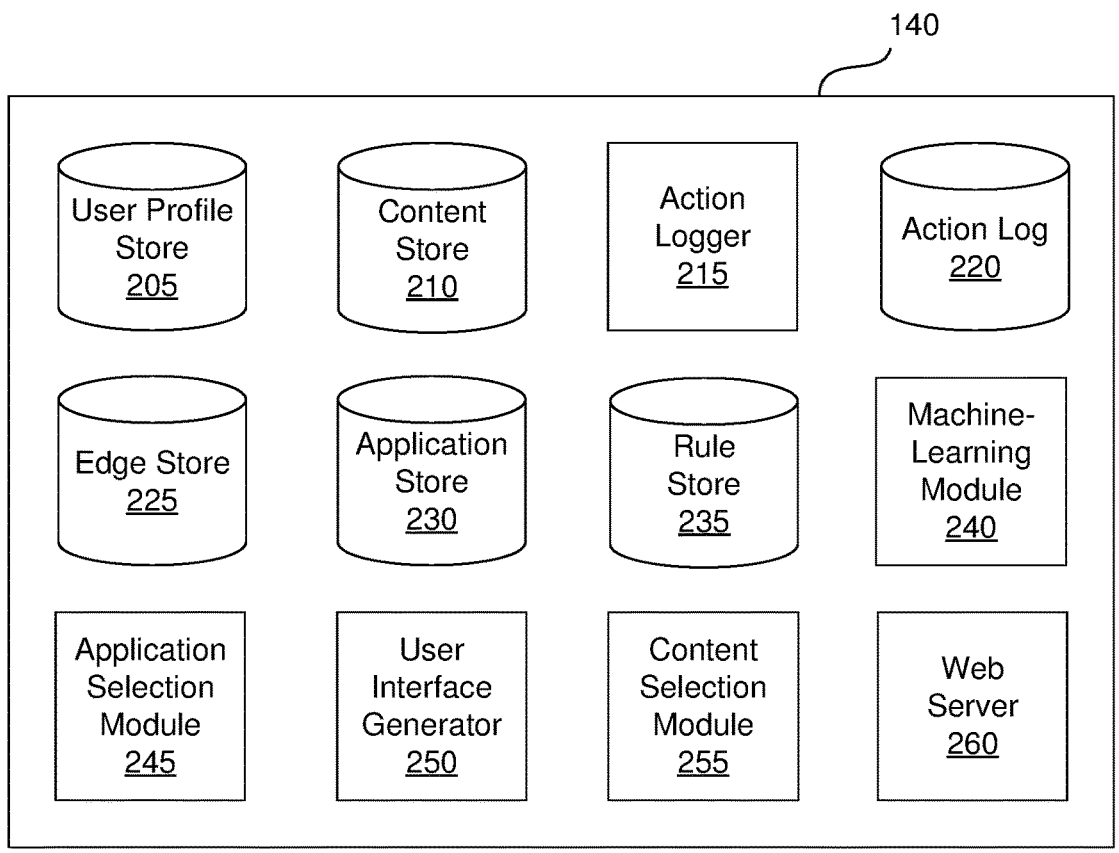
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an application store 230, a rule store 235, a machine-learning module 240, an application selection module 245, a user interface generator 250, a content selection module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

In some embodiments, user profile information associated with a user of the online system 140 stored in the user profile store 205 also may include information associated with one or more messaging applications 150. Examples of such information include information identifying one or more messaging applications 150 installed on one or more client devices 110 associated with the user, information describing one or more settings associated with a messaging application 150 specified by the user, information indicating whether the user has created a user profile for a messaging application 150, etc. For example, if a user of the online system 140 has created a user profile for a messaging application 150, the user profile store 205 may store a username associated with the user in the messaging application 150 in association with the name of the messaging application 150 and a date that the user created the user profile for the messaging application 150. In this example, the user profile store 205 also may store information identifying one or more client devices 110 associated with the user (e.g., IP addresses associated with the client device(s) 110, information describing the numbers and/or types of client device(s) 110, etc.) on which the messaging application 150 is installed and a time at which the user logged into the messaging application 150 using each client device 110.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

In embodiments in which the user profile store 205 stores user profiles associated with entities, information stored in the user profile store 205 also may include information describing target actions associated with the entities. A target action may correspond to a type of action that may be performed by a user of the online system 140 who has been presented with a link that launches a messaging application 150 and initiates a conversation with an entity via the messaging application 150. Examples of target actions include performing a conversion, clicking on a content item, having a deep conversation with an entity via a messaging application 150, expressing a preference for a content item, sharing a content item, registering for an event, attending an event, installing an application, using an application, purchasing a product, purchasing a service, subscribing to a service, accessing a website, checking-in to a physical location, joining a group, establishing a connection with an entity in a messaging application 150, or any other suitable type of action.

Information describing a target action associated with an entity may be stored in the user profile store 205 in association with a user profile associated with the entity. In various embodiments, this information also may describe one or more links that also are associated with the target action (e.g., a link that launches a messaging application 150 and initiates a conversation with the entity via the messaging application 150). Furthermore, in some embodiments, this information also may describe one or more content items associated with the entity that also are associated with the target action (e.g., content items that may include a link that launches a messaging application 150 and initiates a conversation with the entity via the messaging application 150). In various embodiments, information describing a target action associated with an entity may be received from the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In embodiments in which objects stored in the content store 210 represent links and/or content items, the content store 210 also may store information describing target actions in association with the objects. As described above, a target action may correspond to a type of action (e.g., performing a conversion, clicking on a content item, etc.) that may be performed by a user of the online system 140 who has been presented with a link that launches a messaging application 150 and initiates a conversation with an entity via the messaging application 150. If a target action is associated with a link or a content item, information describing the target action may be stored in the content store 210 in association with an object representing the link or the content item, respectively. For example, if a target action associated with a link that launches a messaging application 150 and initiates a conversation with an entity via the messaging application 150 corresponds to performing a conversion associated with the entity, information indicating that the target action corresponds to performing a conversion associated with the entity may be stored in the content store 210 in association with an object representing the link. In the above example, if the link may be included in a content item associated with the entity, the information indicating that the target action corresponds to performing a conversion associated with the entity also or alternatively may be stored in the content store 210 in association with an object representing the content item. As described above, information describing a target action associated with an entity may be received from the entity.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The application store 230 stores various types of information associated with messaging applications 150 that are eligible to be launched by links that initiate conversations with entities via the messaging applications 150. Examples of information associated with a messaging application 150 that may be stored in the application store 230 include information identifying the messaging application 150, information describing one or more geographic locations associated with the messaging application 150, information describing one or more types of client devices 110 on which the messaging application 150 may be installed, information describing one or more types of settings associated with the messaging application 150 that may be specified by a user of the online system 140, etc. For example, the application store 230 may store a name of a messaging application 150 in association with information identifying one or more geographic locations in which the messaging application 150 is most popular, information identifying one or more operating systems that are supported by the messaging application 150, information describing components of a client device 110 that may be accessed by the messaging application 150 (e.g., a speaker, a camera, etc.).

In various embodiments, information associated with a messaging application 150 stored in the application store 230 also may include information associated with one or more entities having a presence on the online system 140. Examples of such information include information identifying each entity with which conversations may be initiated via the messaging application 150, information identifying one or more content items associated with each entity that may include links that launch the messaging application 150, information identifying each entity that has accessed the messaging application 150, information describing a frequency with which each entity has accessed the messaging application 150, etc. For example, suppose that the online system 140 receives information from an entity describing multiple candidate messaging applications 150 that are eligible to be launched by a link included in a content item associated with the entity, such that if the link launches a messaging application 150 selected from the candidate messaging applications 150, the link also initiates a conversation with the entity via the selected messaging application 150. In this example, the application store 230 may store a name of each candidate messaging application 150 in association with information identifying the entity. As an additional example, if an administrator for an entity accesses a messaging application 150, the application store 230 may store a name of the messaging application 150 in association with information identifying the entity, information describing a time at which the administrator accessed the messaging application 150, information describing a type of client device 110 used by the administrator to access the messaging application 150, a geographic location associated with the client device 110 used by the administrator to access the messaging application 150, etc.

In some embodiments, information associated with a messaging application 150 stored in the application store 230 also may include information associated with one or more users of the online system 140. Examples of such information include information identifying each user who installed the messaging application 150, information identifying each user who created a user profile for the messaging application 150, information describing times at which each user logged in to the messaging application 150, information describing a frequency with which each user uses the messaging application 150, information describing one or more settings associated with the messaging application 150 specified by each user, etc. For example, the application store 230 may store information identifying a messaging application 150 in association with information identifying users of the online system 140 who have installed the messaging application 150 and information describing and/or identifying client devices 110 associated with these users. In the above example, the application store 230 also may store the information identifying the messaging application 150 in association with information indicating which of the users who installed the messaging application 150 also have created user profiles for the messaging application 150, information describing a frequency with which each user uses the messaging application 150, information describing an average amount of time that each user is logged in to the messaging application 150, information indicating whether each user has granted the messaging application 150 permission to send the user notifications, to share the user's location, etc. The application store 230 is further described below in conjunction with FIG. 3.

The rule store 235 may store a set of rules that may be accessed by the application selection module 245 (described below) to identify one or more candidate messaging applications 150 that are eligible to be a destination of a link that is presented to a viewing user of the online system 140. The set of rules may describe how the candidate messaging applications 150 are to be selected (e.g., based on information stored in the user profile store 205, the action log 220, the edge store 225, and/or the application store 230). For example, for a viewing user of the online system 140 to whom a link may be presented, a set of rules stored in the rule store 235 may indicate that candidate messaging applications 150 eligible to be the destination of the link include each messaging application 150 that has been installed on a client device 110 associated with the viewing user and for which the viewing user has created a user profile. In the above example, the set of rules also may indicate that only messaging applications 150 that are most popular among online system users associated with a geographic location that also is associated with the viewing user may be included among the candidate messaging applications 150.

A set of rules stored in the rule store 235 also may be used by the application selection module 245 to select a messaging application 150 from multiple candidate messaging applications 150 eligible to be the destination of a link that is presented to a viewing user of the online system 140. The set of rules may describe how a messaging application 150 is to be selected from the candidate messaging applications 150 (e.g., based on information stored in the user profile store 205, the action log 220, the edge store 225, and/or the application store 230). For example, a set of rules stored in the rule store 235 may indicate that a candidate messaging application 150 that a viewing user of the online system 140 uses most frequently to perform a target action is to be selected as the destination of a link that is presented to the viewing user. In some embodiments, one or more rules stored in the rule store 235 may be received from an entity. The rule store 235 is further described below in conjunction with FIG. 3.

The machine-learning module 240 may train a machine-learning model to predict a likelihood that a user of the online system 140 will perform a target action in response to being presented with a link, in which the link launches a messaging application 150 selected from multiple messaging applications 150 and initiates a conversation with an entity via the selected messaging application 150. The machine-learning module 240 may train the model based on information indicating that a portion of online system users who were presented with a set of content items that each included a link that launches a messaging application 150 and initiates a conversation with an entity via the messaging application 150 performed the target action (e.g., by accessing information stored in the action log 220). The machine-learning module 240 also or alternatively may train the model based on one or more attributes of the users (e.g., by accessing information stored in the user profile store 205, the action log 220, and/or the edge store 225), and/or information associated with the messaging applications 150 (e.g., by accessing information stored in the application store 230).

To illustrate an example of how the machine-learning module 240 may train the machine-learning model, suppose that the online system 140 presents a set of content items to a set of users of the online system 140, in which one or more of the set of content items include one or more links that launch one or more messaging applications 150 and initiate conversations with one or more entities via the messaging application(s) 150. In this example, the online system 140 subsequently may receive (e.g., via the action logger 215) information indicating that a subset of the set of users performed a target action, in which each performance of the target action is attributable to a conversation between a user who performed the target action and an entity, and the conversation was initiated by a link included in each of a subset of the set of content items. Continuing with this example, the machine-learning module 240 may train the model based on the information indicating that the subset of the set of users performed the target action, one or more attributes of the set of users (e.g., a geographic location associated with each user, a frequency with which each user uses a messaging application 150, a type of client device 110 associated with each user, etc.), and/or information associated with the messaging applications 150 (e.g., information identifying each messaging application 150 in which a conversation with an entity was initiated).

In some embodiments, the machine-learning module 240 also may train the model based on additional types of information. In some embodiments, the machine-learning module 240 also may train the model based on information describing one or more target actions performed by users of the online system 140. In the above example, the machine-learning module 240 also may train the model based on information describing the target action performed by the set of users, such as whether the target action corresponded to performing a conversion associated with the entity, clicking on a content item associated with the entity, etc. In various embodiments, the machine-learning module 240 also may train the model based on one or more attributes of entities having a presence on the online system 140. In the above example, the machine-learning module 240 also may train the model based on one or more attributes of the set of entities, such as a geographic location associated with each entity, a frequency with which each entity uses a messaging application 150, an industry associated with each entity, etc. The functionality of the machine-learning module 240 is further described below in conjunction with FIG. 3.

The application selection module 245 accesses (e.g., as shown in step 310 of FIG. 3) a machine-learning model trained to predict a likelihood that a user of the online system 140 will perform a target action in response to being presented with a link, in which the link launches a messaging application 150 and initiates a conversation with an entity via the messaging application 150. The trained model may make the prediction based on which of multiple messaging applications 150 is selected to be the destination of the link and one or more attributes of the user. Examples of attributes of the user that may be used by the model to make the prediction include a geographic location associated with the user, a frequency with which the user uses one or more messaging applications 150, one or more types of client devices 110 associated with the user, etc. As described above, in some embodiments, the machine-learning model may be trained by the machine-learning module 240.

For each of multiple candidate messaging applications 150, the application selection module 245 also applies (e.g., as shown in step 315 of FIG. 3) the trained machine-learning model to predict a likelihood that a viewing user of the online system 140 will perform a target action if the viewing user is presented with a link, in which the link launches the candidate messaging application 150 and initiates a conversation with an entity via the candidate messaging application 150. In some embodiments, information identifying one or more of the candidate messaging applications 150 may be received from the entity. In various embodiments, one or more of the candidate messaging applications 150 may be identified by the application selection module 245 based on various types of information maintained in the online system 140 (e.g., in the user profile store 205, the application store 230, and/or the rule store 235). For example, the application selection module 245 may identify one or more of the candidate messaging applications 150 based on one or more rules, information identifying one or more messaging applications 150 installed on a client device 110 associated with the viewing user, information describing one or more settings associated with one or more messaging applications 150 specified by the viewing user, information identifying one or more messaging applications 150 for which the viewing user has created a user profile, etc.

The trained machine-learning model may make the prediction based on various types of information. As described above, in various embodiments, the model may make the prediction based on one or more attributes of the viewing user (e.g., retrieved from the user profile store 205, the action log 220, and/or the edge store 225). In some embodiments, the model also may make the prediction based on information associated with each candidate messaging application 150 (e.g., retrieved from the application store 230), such as a name of each candidate messaging application 150 or a type of client device 110 on which each candidate messaging application 150 may be installed. Furthermore, in various embodiments, the model may make the prediction based on information describing the target action (e.g., retrieved from the user profile store 205 or the content store 210, or received from an entity), such as whether the target action corresponds to expressing a preference for a content item, making a purchase associated with the entity, etc. In embodiments in which the model is trained based on one or more attributes of entities having a presence on the online system 140, the likelihood also may be predicted by the model based on one or more attributes of an entity with which a conversation may be launched via each candidate messaging application 150. Examples of attributes of an entity that may be used by the machine-learning model to make the prediction include a geographic location associated with the entity, a frequency with which the entity uses each candidate messaging application 150, an industry associated with the entity, etc.

The application selection module 245 also selects (e.g., as shown in step 320 of FIG. 3) a messaging application 150 from multiple candidate messaging applications 150 eligible to be the destination of a link presented to a viewing user of the online system 140. In some embodiments, the application selection module 245 may select the messaging application 150 based on a predicted likelihood associated with each candidate messaging application 150 predicted by the trained machine-learning model, as described above. For example, suppose that for each of multiple candidate messaging applications 150, the application selection module 245 has applied the trained machine-learning model to predict a likelihood that a viewing user of the online system 140 will perform a target action in response to being presented with a link, in which the link launches the candidate messaging application 150 and initiates a conversation with an entity via the candidate messaging application 150. In this example, the application selection module 245 may then rank each of the candidate messaging applications 150 based on their associated predicted likelihoods and then select the messaging application 150 associated with the highest predicted likelihood. As described above, in some embodiments, the application selection module 245 also or alternatively may select the messaging application 150 based on a set of rules (e.g., retrieved from the rule store 235). For example, the application selection module 245 may access the rule store 235 and retrieve a rule that indicates that a candidate messaging application 150 that a viewing user of the online system 140 uses most frequently to perform a target action is to be selected as the destination of a link to be presented to the viewing user. In this example, based on the rule, the application selection module 245 may select a corresponding messaging application 150 from the candidate messaging applications 150. The functionality of the application selection module 245 is further described below in conjunction with FIGS. 3 and 4.

The user interface generator 250 generates (e.g., as shown in step 325 of FIG. 3) a content item that includes a link that launches a messaging application 150 selected by the application selection module 245 and initiates a conversation with an entity via the selected messaging application 150. In some embodiments, the content item generated by the user interface generator 250 may include an interactive element (e.g., a button) that acts as the link. In such embodiments, if a viewing user of the online system 140 who is presented with the content item interacts with the interactive element (e.g., by clicking on it), the messaging application 150 selected by the application selection module 245 will be launched on a client device 110 associated with the viewing user at which the content item is presented and a conversation with an entity will be initiated via the selected messaging application 150.

In some embodiments, the user interface generator 250 also may generate a user interface including one or more content items to be presented to a viewing user of the online system 140. In some embodiments, a user interface generated by the user interface generator 250 may include one or more content items selected by the content selection module 255 (described below) for presentation to a viewing user of the online system 140. For example, the user interface generator 250 may generate a feed of content items (e.g., a newsfeed) that includes one or more content items selected by the content selection module 255, which the online system 140 presents in a display area of a client device 110 associated with a viewing user of the online system 140. As an additional example, if the user interface generator 250 generates a display unit (e.g., a pop-up window) including a content item selected by the content selection module 255, the display unit subsequently may be presented along the right side of a display area of a client device 110 associated with a viewing user of the online system 140. The functionality of the user interface generator 250 is further described below in conjunction with FIGS. 3 and 4.

The content selection module 255 selects one or more content items for communication to a client device 110 to be presented to a viewing user of the online system 140. Content items eligible for presentation to the viewing user are retrieved from the content store 210 or from another source by the content selection module 255, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 255 includes content items eligible for presentation to the viewing user in one or more content selection processes, which identify a set of content items for presentation to the viewing user. For example, the content selection module 255 determines measures of relevance of various content items to the viewing user based on characteristics associated with the viewing user by the online system 140 and based on the viewing user's affinity for different content items. Based on the measures of relevance, the content selection module 255 selects content items for presentation to the viewing user. As an additional example, the content selection module 255 selects content items having the highest measures of relevance or having at least a threshold measure of relevance for presentation to the viewing user. Alternatively, the content selection module 255 ranks content items based on their associated measures of relevance and selects content items having the highest positions in the ranking or having at least a threshold position in the ranking for presentation to the viewing user.

Content items selected for presentation to a viewing user may be associated with bid amounts. The content selection module 255 may use the bid amounts associated with content items when selecting content for presentation to a viewing user. In various embodiments, the content selection module 255 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of a viewing user presented with the content from the content item interacting with the content. The content selection module 255 may rank content items based on their associated bid amounts and select content items having at least a threshold position in the ranking for presentation to a viewing user. In some embodiments, the content selection module 255 ranks both content items not associated with bid amounts and content items associated with bid amounts in a unified ranking based on bid amounts and measures of relevance associated with content items. Based on the unified ranking, the content selection module 255 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 255 receives a request to present a feed of content to a viewing user of the online system 140. The feed may include one or more advertisements as well as other content items, such as stories describing actions associated with other online system users connected to the viewing user. The content selection module 255 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 255 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 255 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the online system 140 presents content to a viewing user through a newsfeed including a plurality of content items selected for presentation to the viewing user. One or more advertisements also may be included in the feed. The content selection module 255 may determine the order in which selected content items are presented via the feed. For example, the content selection module 255 orders advertisements or other content items in the feed based on likelihoods of the viewing user interacting with various content items. The functionality of the content selection module 255 is further described below in conjunction with FIG. 3.

The web server 260 links the online system 140 via the network 120 to the one or more client devices 110, as well as to the one or more third-party systems 130 and to the one or more messaging applications 150. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Figure 3:
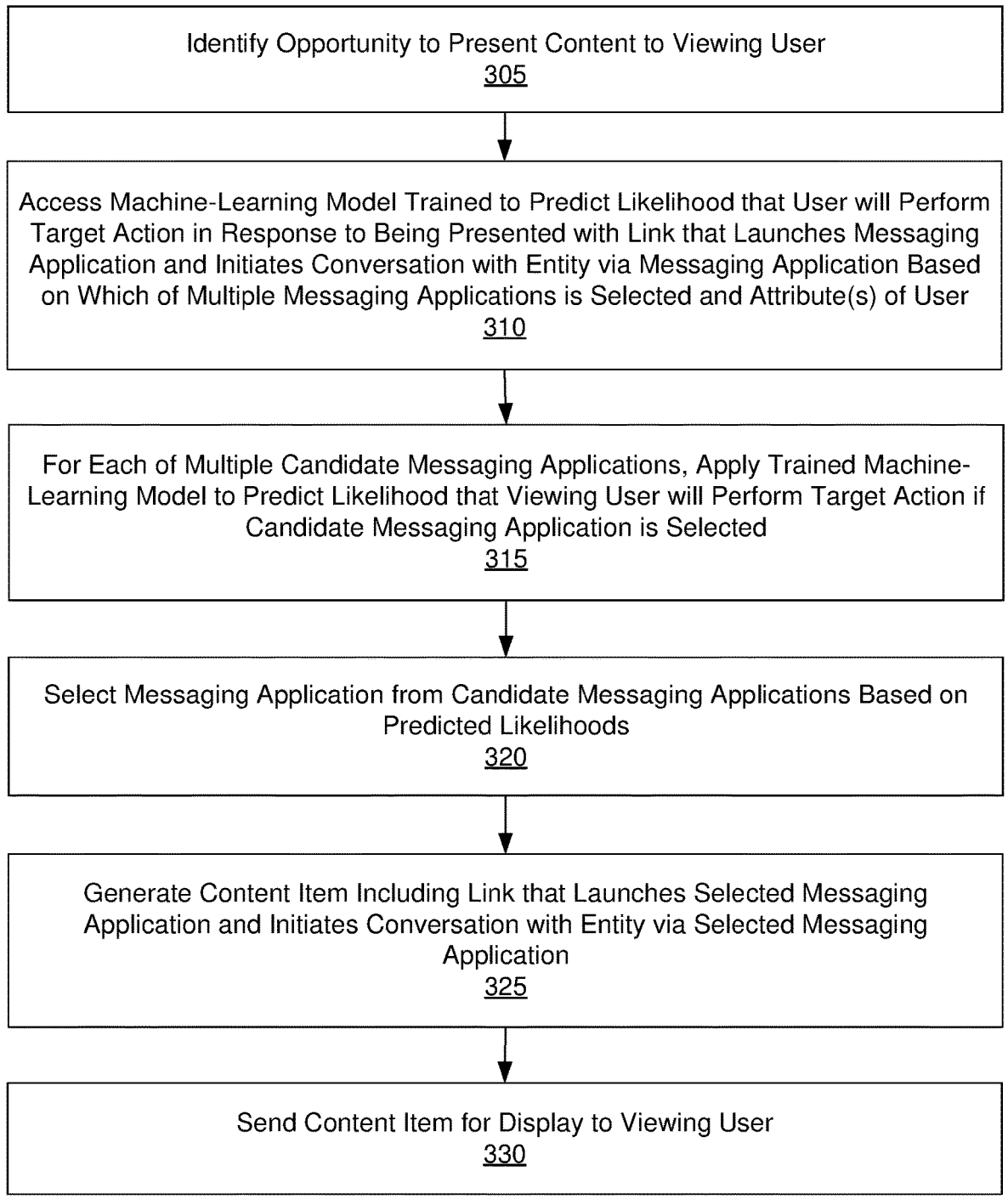
FIG. 3 is a flow chart of a method for selecting a messaging application from multiple messaging applications eligible to be a destination of a link included in a content item presented to an online system user, in accordance with an embodiment.

Selecting a Messaging Application from Multiple Messaging Applications Eligible to be a Destination of a Link Included in a Content Item Presented to an Online System User FIG. 3 is a flow chart of a method for selecting a messaging application from multiple messaging applications eligible to be a destination of a link included in a content item presented to an online system user. In other embodiments, the method may include different and/or additional steps than those shown in FIG. 3. Additionally, steps of the method may be performed in a different order than the order described in conjunction with FIG. 3.

The online system 140 identifies 305 an opportunity to present content to a viewing user of the online system 140. For example, the online system 140 may identify 305 an opportunity to present content to the viewing user upon receiving a request from the viewing user to access a user profile page associated with the viewing user maintained in the online system 140, in which the user profile page includes a newsfeed in which various content items may be presented. As an additional example, the online system 140 may identify 305 an opportunity to present content to the viewing user upon receiving a request to present a web page maintained in the online system 140 to the viewing user, in which the web page includes a scrollable unit in which various types of content items (e.g., advertisements) may be presented.

The online system 140 then accesses 310 (e.g., using the application selection module 245) a machine-learning model trained to predict a likelihood that a user of the online system 140 will perform a target action in response to being presented with a link, in which the link launches a messaging application 150 and initiates a conversation with an entity via the messaging application 150. The trained machine-learning model may make the prediction based on which of multiple messaging applications 150 is selected to be the destination of the link, as well as one or more attributes of the user (e.g., a geographic location associated with the user, a frequency with which the user uses one or more messaging applications 150, one or more types of client devices 110 associated with the user, etc.). As described above, in some embodiments, the machine-learning model may be trained by the online system 140 (e.g., using the machine-learning module 240).

Then, for each of multiple candidate messaging applications 150 eligible to be a destination of a link presented to the viewing user, the online system 140 applies 315 (e.g., using the application selection module 245) the trained machine-learning model to predict a likelihood that the viewing user will perform the target action if the candidate messaging application 150 is selected as the destination of the link. In some embodiments, information identifying one or more of the candidate messaging applications 150 may be received from the entity. In various embodiments, one or more of the candidate messaging applications 150 also may be identified by the online system 140 (e.g., using the application selection module 245) based on various types of information maintained in the online system 140 (e.g., in the user profile store 205, the application store 230, and/or the rule store 235). For example, the online system 140 may identify one or more of the candidate messaging applications 150 based on one or more rules, information identifying one or more messaging applications 150 installed on a client device 110 associated with the viewing user, information describing one or more settings associated with one or more messaging applications 150 specified by the viewing user, information identifying one or more messaging applications 150 for which the viewing user has created a user profile, etc.

As described above, the machine-learning model may make the prediction based on various types of information. In some embodiments, the model may make the prediction based on one or more attributes of the viewing user (e.g., retrieved from the user profile store 205, the action log 220, and/or the edge store 225). In various embodiments, the model also may make the prediction based on information associated with each candidate messaging application 150 (e.g., retrieved from the application store 230), such as a name of each candidate messaging application 150 or a type of client device 110 on which each candidate messaging application 150 may be installed. Furthermore, in various embodiments, the model may make the prediction based on information describing the target action (e.g., retrieved from the user profile store 205 or the content store 210, or received from the entity), such as whether the target action corresponds to expressing a preference for a content item, making a purchase associated with the entity, etc. In some embodiments, the likelihood also may be predicted by the model based on one or more attributes of the entity with which a conversation may be launched via each candidate messaging application 150 (e.g., a geographic location associated with the entity, a frequency with which the entity uses each candidate messaging application 150, an industry associated with the entity, etc.).

Figure 4:
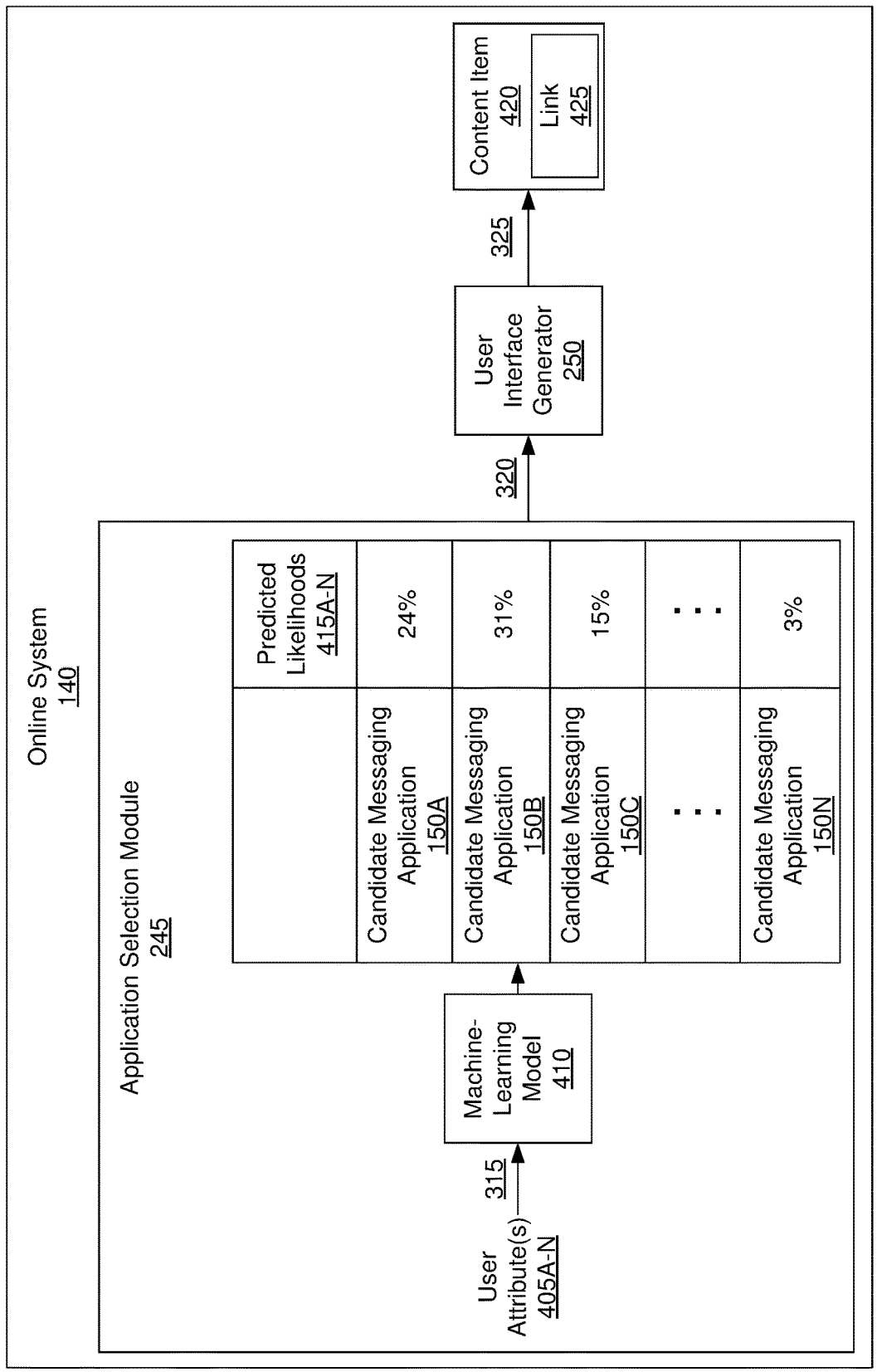
FIG. 4 is a conceptual diagram of selecting a messaging application from multiple messaging applications eligible to be a destination of a link included in a content item presented to an online system user, in accordance with an embodiment.

FIG. 4 illustrates an example of how the online system 140 may apply 315 the trained machine-learning model 410. In this example, the online system 140 provides an input to the model 410 that includes various attributes of the viewing user 405A-N (e.g., a geographic location associated with the viewing user, a type of client device 110 associated with the viewing user, information indicating whether the viewing user has installed each candidate messaging application 150A-N, a frequency with which the viewing user uses each candidate messaging application 150A-N, etc.). In this example, for each candidate messaging application 150A-N, the online system 140 may receive an output from the model 410 indicating a predicted likelihood 415A-N that the viewing user will perform the target action in response to being presented with a link that launches the candidate messaging application 150A-N and initiates a conversation with the entity via the candidate messaging application 150A-N.

Referring back to FIG. 3, the online system 140 then selects 320 (e.g., using the application selection module 245) a messaging application 150 from the candidate messaging applications 150 based on the likelihoods predicted by the machine-learning model. For example, as shown in FIG. 4, once the online system 140 has applied 315 the trained machine-learning model 410 to predict the likelihood 415A-N associated with each candidate messaging application 150A-N, the online system 140 may select 320 a messaging application 150 (e.g., by ranking each of the candidate messaging applications 150A-N based on its associated predicted likelihood 415A-N and then selecting 320 a messaging application 150 associated with the highest predicted likelihood 415A-N). Although not illustrated in FIG. 4, in some embodiments, the online system 140 also or alternatively may select 320 the messaging application 150 from the candidate messaging applications 150 using a set of rules. For example, if the online system 140 accesses a rule (e.g., from the rule store 235) that indicates that a candidate messaging application 150 that the viewing user uses most frequently to perform the target action is to be selected 320 as the destination of the link, the online system 140 may select 320 a corresponding messaging application 150 from the candidate messaging applications 150 based on the rule.

Referring again to FIG. 3, the online system 140 then generates 325 (e.g., using the user interface generator 250) a content item that includes a link that launches the selected messaging application 150 and initiates a conversation with the entity via the selected messaging application 150. For example, as shown in FIG. 4, once a messaging application 150 has been selected 320, information describing the selected messaging application 150 is used by the online system 140 to generate 325 a content item 420 including a link 425 that launches the selected messaging application 150 and initiates a conversation with the entity via the selected messaging application 150. Although not illustrated in FIG. 4, in some embodiments, the content item generated 325 by the online system 140 may include an interactive element (e.g., a button) that acts as the link, such that if the viewing user is presented with the content item and interacts with the interactive element (e.g., by clicking on it), the selected messaging application 150 will be launched on a client device 110 at which the content item is presented and a conversation with the entity will be initiated via the selected messaging application 150.

Referring once more to FIG. 3, once generated 325, the content item is then sent 330 for display to the viewing user. For example, the content item may be sent 330 to a client device 110 associated with the viewing user for presentation to the viewing user. In some embodiments, the content item is sent 330 for display to the viewing user if the content item is included among a set of content items selected (e.g., using the content selection module 255) for presentation to the viewing user. For example, if the content item is included among multiple content items selected for presentation to the viewing user within a newsfeed associated with the viewing user, the content item may be sent 330 for display to the viewing user within the newsfeed.

Additional Embodiments

Embodiments herein have been described with respect to presenting content to a user with a link to initiate a conversation using a particular messaging application, where the messaging application was selected from a plurality of possible messaging applications to optimize for the likelihood that the user will actually engage in a conversation using the application or perform some other desired application. In alternative embodiments, destinations other than a messaging application may be selected to optimize of a desired user action. For example, when different user actions are desired, the system may select different applications or other tools that the user can use to perform the actions.

In one example, the system provides content containing a link that prompts a viewing user to provide information, such as name, email, or phone number. There may be multiple alternative tools that the user can use to provide the requested information, such as a web form or an application from a third-party. Using the techniques described herein, the system may select from the candidates to optimize for the likelihood that the viewing user will respond with the requested information. This can be expanded to select the "destination" for any link that enables a user to perform a requested action, where multiple alternatives exist.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
identifying an opportunity to present content to a viewing user of an online system;
accessing a machine-learning model trained to predict a likelihood that a user of the online system will perform a target action in response to being presented with a link that launches a messaging application and initiates a conversation with an entity via the messaging application in which the user and the entity exchange text messages within an interface of the messaging application, wherein the likelihood is predicted based at least in part on which of a plurality of messaging applications is selected and one or more attributes of the user;
for each of a plurality of candidate messaging applications, applying the trained machine-learning model to predict the likelihood that the viewing user will perform the target action if the candidate messaging application is selected from the plurality of candidate messaging applications for inclusion in a content item;
selecting a messaging application from the plurality of candidate messaging applications for inclusion in a content item, wherein the messaging application is selected based at least in part on the predicted likelihoods;
generating a content item that comprises a link that launches the selected messaging application and initiates a conversation with the entity via the selected messaging application; and
sending the content item to a client device associated with the viewing user for presentation to the viewing user.

2. The method of claim 1, wherein the target action is selected from the group consisting of: performing a conversion, clicking on a content item, having a deep conversation with an entity via a messaging application, expressing a preference for a content item, sharing a content item, registering for an event, attending an event, installing an application, using an application, purchasing a product, purchasing a service, subscribing to a service, accessing a website, checking-in to a physical location, joining a group, and establishing a connection with an entity in a messaging application.

3. The method of claim 1, further comprising:
presenting a set of content items to a set of users of the online system, one or more of the set of content items comprising one or more links that launch one or more messaging applications of the plurality of messaging applications and initiate conversations with one or more entities via the one or more messaging applications;
receiving information indicating that a subset of the set of users performed the target action, wherein each performance of the target action is attributable to each of a set of conversations between the subset of the set of users and a set of entities and each of the set of conversations is initiated by a link comprising each of a subset of the set of content items; and
training the machine-learning model based at least in part on the information indicating that the subset of the set of users performed the target action, one or more attributes of the set of users, and information identifying the plurality of messaging applications.

4. The method of claim 3, wherein the one or more attributes of the set of users are selected from the group consisting of: a geographic location associated with each of the set of users, a frequency with which each of the set of users uses a messaging application, a type of client device associated with each of the set of users, and any combination thereof.

5. The method of claim 4, wherein the one or more attributes of the viewing user are selected from the group consisting of: a geographic location associated with the viewing user, a frequency with which the viewing user uses a messaging application, a type of client device associated with the viewing user, and any combination thereof.

6. The method of claim 3, wherein training the machine-learning model is further based at least in part on one or more attributes of the set of entities, wherein the one or more attributes of the set of entities are selected from the group consisting of: a geographic location associated with each of the set of entities, a frequency with which each of the set of entities uses a messaging application, an industry associated with each of the set of entities, and any combination thereof.

7. The method of claim 6, wherein the likelihood predicted by the trained machine-learning model is further based at least in part on one or more attributes of the entity, the one or more attributes of the entity selected from the group consisting of: a geographic location associated with the entity, a frequency with which the entity uses a messaging application, an industry associated with the entity, and any combination thereof.

8. The method of claim 1, wherein selecting the messaging application from the plurality of candidate messaging applications is further based at least in part on a set of rules, wherein a subset of the set of rules is received from the entity.

9. The method of claim 1, further comprising:
receiving information from the entity identifying one or more of the plurality of candidate messaging applications.

10. The method of claim 1, further comprising:
identifying the plurality of candidate messaging applications based at least in part on information maintained in the online system associated with the viewing user selected from the group consisting of: information identifying one or more messaging applications installed on the client device associated with the viewing user, information describing one or more settings associated with one or more messaging applications specified by the viewing user, information identifying one or more messaging applications for which the viewing user has created a user profile, and any combination thereof.

11. A computer program product comprising a non-transitory computer readable storage medium having instructions encoded thereon that, when executed by a processor, cause the processor to:
identify an opportunity to present content to a viewing user of an online system;
access a machine-learning model trained to predict a likelihood that a user of the online system will perform a target action in response to being presented with a link that launches a messaging application and initiates a conversation with an entity via the messaging application in which the user and the entity exchange text messages within an interface of the messaging application, wherein the likelihood is predicted based at least in part on which of a plurality of messaging applications is selected and one or more attributes of the user;

for each of a plurality of candidate messaging applications, apply the trained machine-learning model to predict the likelihood that the viewing user will perform the target action if the candidate messaging application is selected from the plurality of candidate messaging applications to be included in a content item;

select a messaging application from the plurality of candidate messaging applications to include in a content item, wherein the messaging application is selected based at least in part on the predicted likelihoods;

generate a content item that comprises a link that launches the selected messaging application and initiates a conversation with the entity via the selected messaging application; and send the content item to a client device associated with the viewing user for presentation to the viewing user.

12. The computer program product of claim 11, wherein the target action is selected from the group consisting of: performing a conversion, clicking on a content item, having a deep conversation with an entity via a messaging application, expressing a preference for a content item, sharing a content item, registering for an event, attending an event, installing an application, using an application, purchasing a product, purchasing a service, subscribing to a service, accessing a website, checking-in to a physical location, joining a group, and establishing a connection with an entity in a messaging application.

13. The computer program product of claim 11, wherein the computer-readable storage medium further has instructions encoded thereon that, when executed by the processor, cause the processor to:

present a set of content items to a set of users of the online system, one or more of the set of content items comprising one or more links that launch one or more messaging applications of the plurality of messaging applications and initiate conversations with one or more entities via the one or more messaging applications;

receive information indicating that a subset of the set of users performed the target action, wherein each performance of the target action is attributable to each of a set of conversations between the subset of the set of users and a set of entities and each of the set of conversations is initiated by a link comprising each of a subset of the set of content items; and train the machine-learning model based at least in part on the information indicating that the subset of the set of users performed the target action, one or more attributes of the set of users, and information identifying the plurality of messaging applications.

14. The computer program product of claim 13, wherein the one or more attributes of the set of users are selected from the group consisting of: a geographic location associated with each of the set of users, a frequency with which each of the set of users uses a messaging application, a type of client device associated with each of the set of users, and any combination thereof.

15. The computer program product of claim 14, wherein the one or more attributes of the viewing user are selected from the group consisting of: a geographic location associated with the viewing user, a frequency with which the viewing user uses a messaging application, a type of client device associated with the viewing user, and any combination thereof.

16. The computer program product of claim 13, wherein train the machine-learning model is further based at least in part on one or more attributes of the set of entities, wherein the one or more attributes of the set of entities are selected from the group consisting of: a geographic location associated with each of the set of entities, a frequency with which each of the set of entities uses a messaging application, an industry associated with each of the set of entities, and any combination thereof.

17. The computer program product of claim 16, wherein the likelihood predicted by the trained machine-learning model is further based at least in part on one or more attributes of the entity, the one or more attributes of the entity selected from the group consisting of: a geographic location associated with the entity, a frequency with which the entity uses a messaging application, an industry associated with the entity, and any combination thereof.

18. The computer program product of claim 11, wherein select the messaging application from the plurality of candidate messaging applications is further based at least in part on a set of rules, wherein a subset of the set of rules is received from the entity.

19. The computer program product of claim 11, wherein the computer-readable storage medium further has instructions encoded thereon that, when executed by the processor, cause the processor to:

receive information from the entity identifying one or more of the plurality of candidate messaging applications.

20. The computer program product of claim 11, wherein the computer-readable storage medium further has instructions encoded thereon that, when executed by the processor, cause the processor to:

identify the plurality of candidate messaging applications based at least in part on information maintained in the online system associated with the viewing user selected from the group consisting of: information identifying one or more messaging applications installed on the client device associated with the viewing user, information describing one or more settings associated with one or more messaging applications specified by the viewing user, information identifying one or more messaging applications for which the viewing user has created a user profile, and any combination thereof.

* * * * *